(12) United States Patent
Padebettu et al.

(10) Patent No.: US 12,323,385 B2
(45) Date of Patent: Jun. 3, 2025

(54) MAPPING INTERNET PROTOCOL (IP) ADDRESSES TO IP OVER ETHERNET SUBSCRIBER IDENTIFIERS

(71) Applicant: Juniper Networks, Inc., Sunnyvale, CA (US)

(72) Inventors: Venkatesh Padebettu, Bangalore (IN); Rivu Santra, Bangalore (IN); Rajesh Katragadda, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/366,401

(22) Filed: Aug. 7, 2023

(65) Prior Publication Data

US 2025/0055828 A1 Feb. 13, 2025

(51) Int. Cl.
*H04L 61/45* (2022.01)
*H04L 61/5014* (2022.01)
*H04L 9/40* (2022.01)
*H04L 43/16* (2022.01)
*H04L 101/686* (2022.01)

(52) U.S. Cl.
CPC .......... *H04L 61/45* (2022.05); *H04L 61/5014* (2022.05); *H04L 43/16* (2013.01); *H04L 63/02* (2013.01); *H04L 2101/686* (2022.05)

(58) Field of Classification Search
CPC ................. H04L 61/45; H04L 61/5014; H04L 2101/686; H04L 43/16; H04L 63/02
See application file for complete search history.

(56) References Cited

U.S. PATENT DOCUMENTS

| | | | |
|---|---|---|---|
| 8,416,691 B1 | 4/2013 | Haberman et al. | |
| 10,673,992 B1* | 6/2020 | Weiser | H04L 69/16 |
| 10,735,995 B1* | 8/2020 | Pocha | H04W 28/0263 |
| 2015/0180774 A1* | 6/2015 | Loach | H04L 61/2514 |
| | | | 370/392 |

OTHER PUBLICATIONS

Alcatel., "Enhanced Subscriber Management for Triple Play—Applying Programmable Subscriber Configuration Policies," Nov. 2006, 13 pages, XP002479539.
Extended European Search Report for Application No. EP23201264.1, mailed on Feb. 22, 2024, 9 pages.
Volz B., et al., "Dynamic Host Configuration Protocol for IPv6 (DHCPv6) Relay Agent Subscriber-ID Option," Internet Engineering Task Force, Jun. 2006, 6 pages, XP015046383.

* cited by examiner

*Primary Examiner* — Adnan M Mirza
(74) *Attorney, Agent, or Firm* — Harrity & Harrity, LLP

(57) ABSTRACT

In some implementations, a network device may receive one or more indications of one or more internet protocol (IP) addresses. The network device may determine that the one or more IP addresses are associated with an IP over Ethernet (IPoE) subscriber. The network device may generate, based at least in part on determining that the one or more IP addresses are associated with the IPoE subscriber, a mapping of the one or more IP addresses to an identifier of the IPoE subscriber. The network device may receive a network packet associated with at least one IP address of the one or more IP addresses. The network device may perform, based at least in part on the mapping of the one or more IP addresses to the identifier of the IPoE subscriber, a network service associated with the network packet on a per-IPoE-subscriber basis.

20 Claims, 6 Drawing Sheets

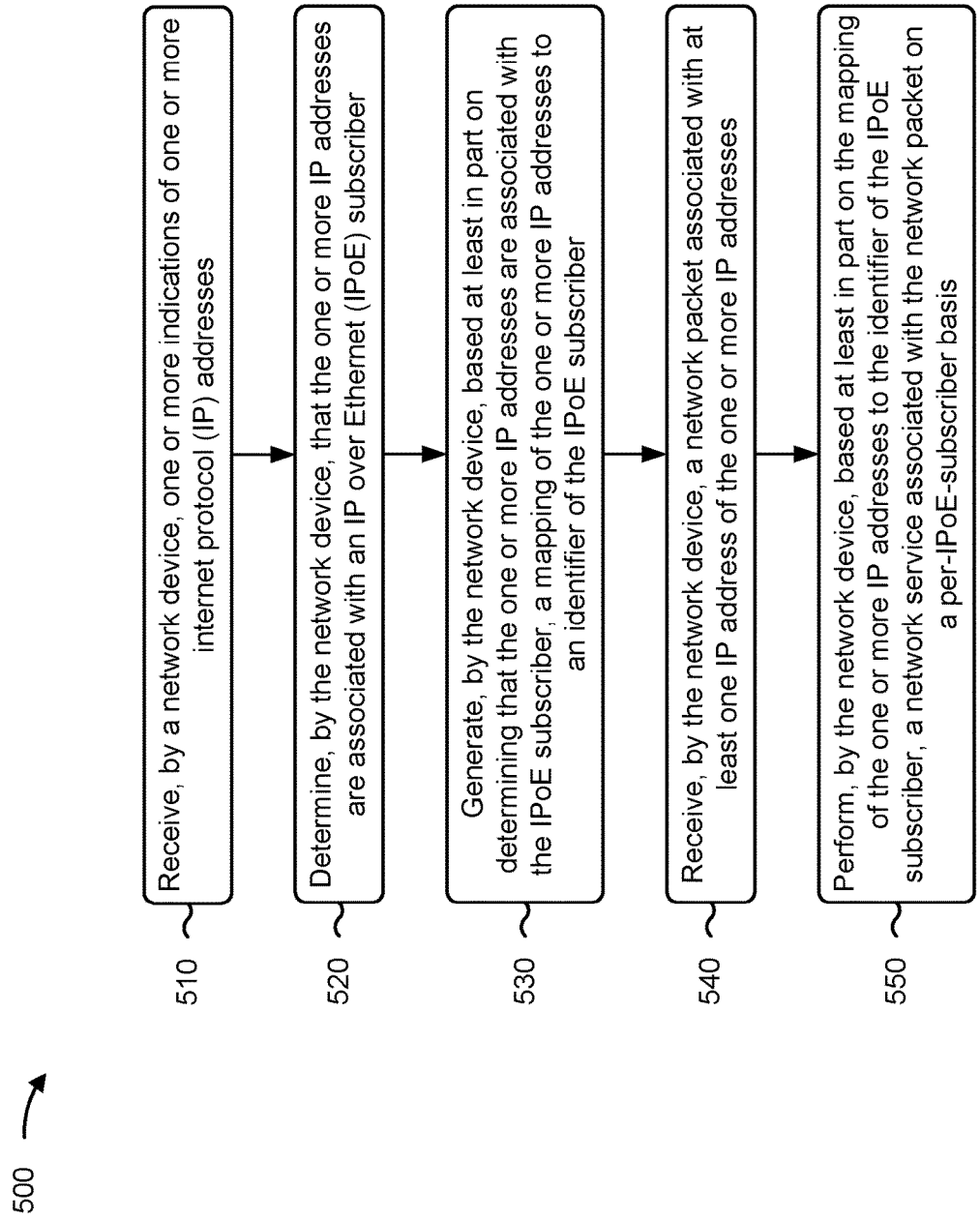

US 12,323,385 B2

MAPPING INTERNET PROTOCOL (IP) ADDRESSES TO IP OVER ETHERNET SUBSCRIBER IDENTIFIERS

BACKGROUND

Internet Protocol over Ethernet (IPoE) enables delivery of an internet protocol (IP) payload over an access network via Ethernet. By encapsulating IP datagrams in Ethernet frames, IPoE can be suitable for multicast delivery to multiple users.

SUMMARY

Some implementations described herein relate to a method. The method may include receiving, by a network device, one or more indications of one or more IP addresses. The method may include determining, by the network device, that the one or more IP addresses are associated with an IPoE subscriber. The method may include generating, by the network device, based at least in part on determining that the one or more IP addresses are associated with the IPoE subscriber, a mapping of the one or more IP addresses to an identifier of the IPoE subscriber. The method may include receiving, by the network device, a network packet associated with at least one IP address of the one or more IP addresses. The method may include performing, by the network device, based at least in part on the mapping of the one or more IP addresses to the identifier of the IPoE subscriber, a network service associated with the network packet on a per-IPoE-subscriber basis.

Some implementations described herein relate to a network device. The network device may include one or more memories and one or more processors. The one or more processors may receive one or more indications of one or more IP addresses. The one or more processors may determine that the one or more IP addresses are associated with an IPoE subscriber. The one or more processors may generate, based at least in part on determining that the one or more IP addresses are associated with the IPoE subscriber, a mapping of the one or more IP addresses to an identifier of the IPoE subscriber. The one or more processors may receive a network packet associated with at least one IP address of the one or more IP addresses. The one or more processors may perform, based at least in part on the mapping of the one or more IP addresses to the identifier of the IPoE subscriber, a network service associated with the network packet on a per-IPoE-subscriber basis.

Some implementations described herein relate to a non-transitory computer-readable medium that stores a set of instructions. The set of instructions, when executed by one or more processors of a network device, may cause the network device to receive one or more indications of one or more IP addresses. The set of instructions, when executed by one or more processors of the network device, may cause the network device to determine that the one or more IP addresses are associated with an IPoE subscriber. The set of instructions, when executed by one or more processors of the network device, may cause the network device to generate, based at least in part on determining that the one or more IP addresses are associated with the IPoE subscriber, a mapping of the one or more IP addresses to an identifier of the IPoE subscriber. The set of instructions, when executed by one or more processors of the network device, may cause the network device to receive a network packet associated with at least one IP address of the one or more IP addresses. The set of instructions, when executed by one or more processors of the network device, may cause the network device to perform, based at least in part on the mapping of the one or more IP addresses to the identifier of the IPoE subscriber, a network service associated with the network packet on a per-IPoE-subscriber basis.

BRIEF DESCRIPTION OF THE DRAWINGS

FIG. 5 is a flowchart of an example process associated with mapping IP addresses to IPoE subscriber identifiers.

DETAILED DESCRIPTION

Figure 1A:
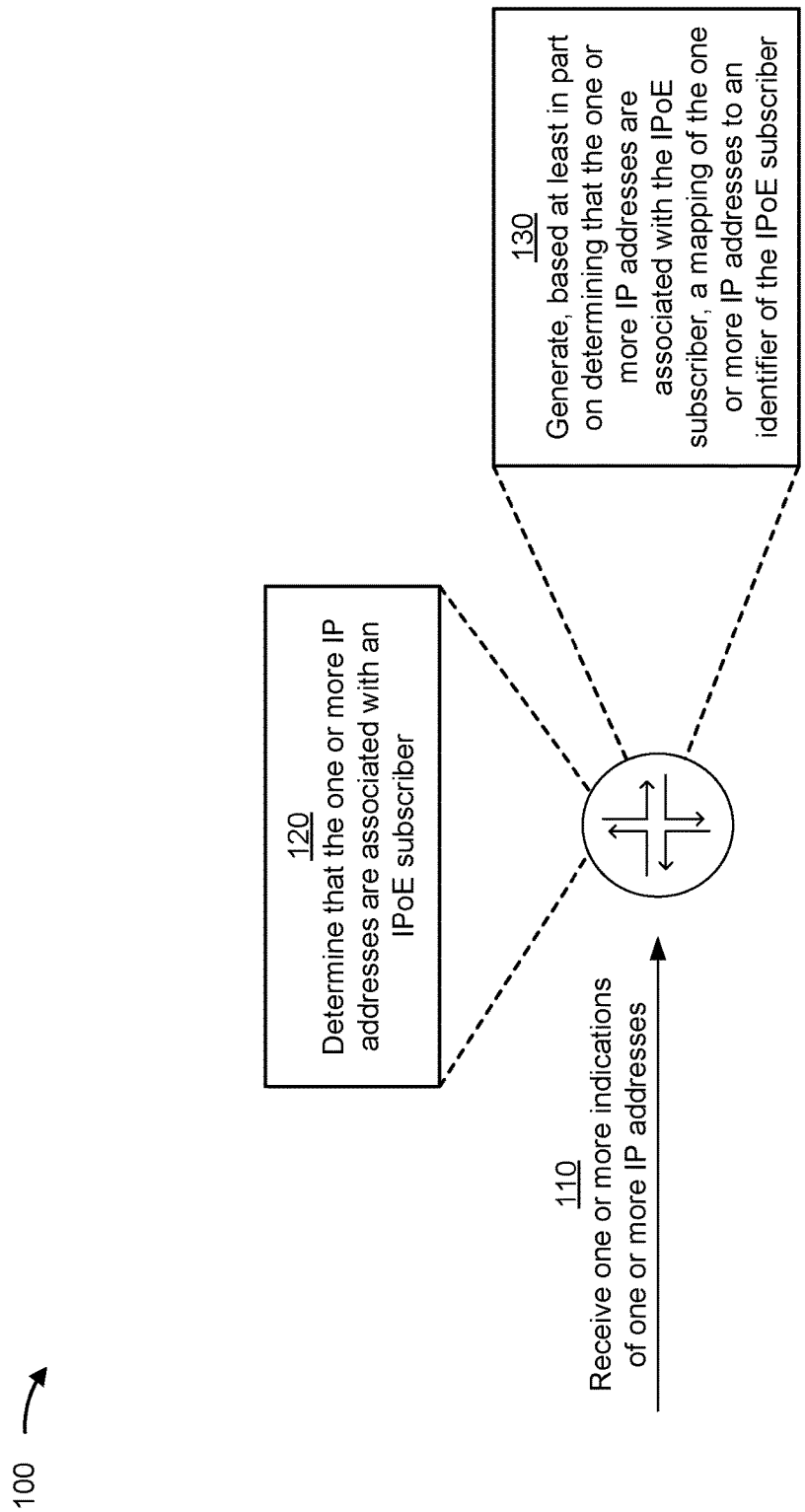
FIGS. 1A-1B are diagrams of an example implementation associated with mapping IP addresses to an IPoE subscriber identifier.

The following detailed description of example implementations refers to the accompanying drawings. The same reference numbers in different drawings may identify the same or similar elements.

Network processors, such as fixed pipeline and semi-flexible pipeline-based application-specific integrated circuits (ASICs), can implement IPoE subscriber access models. For example, these network processors may implement 1:1 or 1:N virtual local area network (VLAN) access models where a source IP address identifies an IPoE subscriber (e.g., a household). In some cases, an IPoE subscriber can use multiple IP addresses for network access. If multiple IP addresses (e.g., IP version 4 (IPv4) and/or IP version 6 (IPv6)) are assigned to a single subscriber, the network processors apply services and collect aggregate statistics for the IPoE subscriber on a per-IP-address basis. Each network packet associated with an IP address of the IPoE subscriber conforms to the same network rules.

Because the network processors that handle the network packets treat the network packets on a per-IP-address basis, an inordinate amount of hardware resources on the network processors is occupied. For example, because a single IPoE subscriber is mapped to a single IP address, multiple IP addresses are, at scale, handled as though the IP addresses belong to different subscribers (in the sense that the network processors independently apply network services to the corresponding network packets), despite corresponding to the same IPoE subscriber. Thus, even though the actual quantity of IPoE subscribers is much smaller than the total quantity of IP addresses, the network packets are handled on a per-IP-address basis.

For example, if each network packet follows the same three firewall policies, then those three firewall policies are enforced for each IP address. Or, if an IPoE subscriber has a download volume threshold or a download speed threshold, then the download activity across different IP addresses associated with the IPoE subscriber is aggregated, which increases complexity (e.g., computing resources, bandwidth, or the like). As a result, network services (e.g., firewall policy enforcement, network statistics tracking, or the like) are replicated for each identifier (e.g., source IP address), and the associated hardware resources (e.g., ternary contentaddressable memory (TCAM), statistics-tracking resources, or the like) linearly increases with the quantity of IP addresses.

Some implementations described herein enable mapping IP addresses to an IPoE subscriber and applying network services (e.g., firewall policies, network statistics tracking, or the like) on a per-IPoE-subscriber basis (e.g., rather than on a per-IP-address basis). For example, the IP addresses mapped to an IPoE subscriber may be an IPv4 addresses, IPv6 addresses, framed IP addresses, static IP addresses, or the like. Based on the mapping, a network device may perform a network service on a per-IPoE-subscriber basis, such as applying a firewall policy, monitoring network statistics, or the like.

As a result, by offering network services on a per-IPoE-subscriber basis (e.g., rather than a per-IP-address basis), hardware resource usage may be reduced. For example, the network device may track and enforce fewer firewall policies than the network device would track and enforce using a per-IP-address framework. Additionally, or alternatively, the network device can track network statistics based on a single IPoE subscriber without explicitly tracking usage over multiple, different IP addresses, which may reduce computational complexity.

Figure 1B:
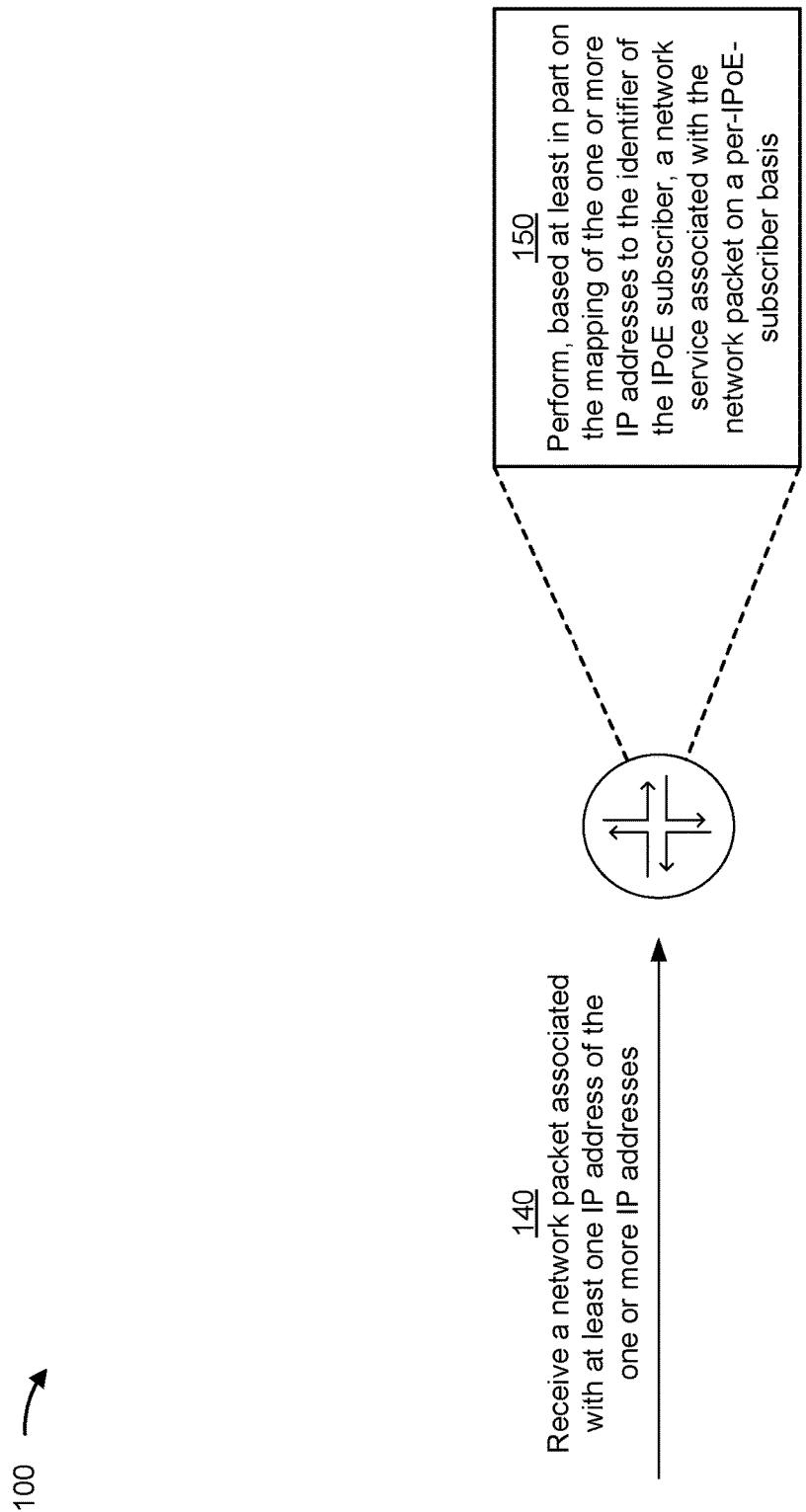

FIGS. 1A-1B are diagrams of an example implementation 100 associated with mapping internet protocol (IP) addresses to an IPoE subscriber identifier. As shown in FIGS. 1A-1B, example implementation 100 includes a network device. The network device is described in more detail below in connection with FIGS. 2-4.

The network device may be a subscriber access device (e.g., an access gateway function (AGF), a broadband network gateway (BNG), a BNG user plane (BNG-UP) device, an AGF user plane (AGF-UP) device, a co-located BNG/AGF, a co-located BNG-UP/AGF-UP device, or the like). The network device may route traffic between client devices associated with an IPoE subscriber (e.g., customer premises equipment (CPE), a residential gateway (RG), a user equipment (UE), and/or the like) and broadband remote access devices, such as digital subscriber line access multiplexers (DSLAMs), on an Internet service provider (ISP) network, and/or provide services such as marking, policing, and shaping. The network device may include one or more network processors, such as fixed pipeline and semi-flexible pipeline-based ASICs, that implement IPoE subscriber access models (e.g., 1:1 or 1:N VLAN access).

As shown by reference number 110, the network device may receive one or more indications of one or more IP addresses. In some aspects, the one or more IP addresses may include an IPv4 address, an IPv6 address, a framed IP address, a static IP address, or the like.

In a case where the one or more IP addresses include an IPv4 address or an IPv6 address, the one or more indications may include a dynamic host configuration protocol (DHCP) packet that enables the client device and a DHCP server to communicate with each other. For example, the client device may communicate with the DHCP server to obtain an IP address that is to be reserved for the client device.

In a case where the one or more IP addresses include an IPv4 address, the client device and the DHCP server may communicate using DHCP for IPv4 (DHCPv4) to allow the client device to obtain an assigned IP address. A DHCPv4 procedure may involve transmission of discover, offer, request, and acknowledgement (DORA) packets. For example, the DHCP client may send, to the DHCP server, a discover message requesting an IP address (e.g., that is to be reserved for the client device); the DHCP server, based on the discover message, may send, to the client device, an offer message that offers an IP address; the client device, based on the offer message, may send, to the DHCP server, a request message requesting the offered IP address (e.g., to be reserved for the client device); and the DHCP server, based on the request message, may send, to the client device, an acknowledgment message indicating that the IP address is assigned to the client device.

In some aspects, the one or more indications of the one or more IP addresses (e.g., an IPv4 address) may include a DHCP offer packet. For example, the network device may receive a DHCP offer packet, which contains the IPv4 address, and identify the IPv4 address based on the contents of the DHCP offer packet. The DHCP offer packet may be sent from the DHCP server and destined for the client device. The one or more indications of the one or more IP addresses including a DHCP offer packet may enable the network device to determine the IPv4 address.

In a case where the one or more IP addresses include an IPv6 address, the IPv6 address may be an IPv6 identity association for non-temporary address (IA_NA) (e.g., an IP address with a /128 prefix), an IPv6 identity association for prefix delegation (IA_PD) address (e.g., an IP address with any suitable prefix, such as /56). In a case where the one or more IP addresses include an IPv6 address, the client device and the DHCP server may communicate using DHCP for IPv6 (DHCPv6) to allow the client device to obtain an assigned IP address. For example, the client device may send, to the DHCP server, a solicit message requesting an IP address (e.g., that is to be reserved for the client device); the DHCP server, based on the solicit message, may send, to the client device, an advertise message that offers an IP address; the client device, based on the advertise message, may send, to the DHCP server, a request message requesting the offered IP address (e.g., to be reserved for the client device); and the DHCP server, based on the request message, may send, to the client device, a reply message indicating that the IP address is assigned to the client device.

In some aspects, the one or more indications of the one or more IP addresses (e.g., an IPv6 address) may include a DHCP advertise packet. For example, the network device may receive a DHCP advertise packet, which contains the IPv6 address, and identify the IPv6 address based on the contents of the DHCP advertise packet. The DHCP advertise packet may be sent from the DHCP server and destined for the client device. The one or more indications of the one or more IP addresses including a DHCP advertise packet may enable the network device to determine the IPv6 address.

In a case where the one or more IP addresses include a framed IP address (e.g., a framed IPv4 address or a framed IPv6 address), the client device may communicate with a remote authentication dial-in user service (RADIUS) server, which provides user authorization and authentication services. The one or more indications of the one or more IP addresses (e.g., a framed IP address) may include a RADIUS access accept message. For example, the client device may send, to a RADIUS server via the network device, a RADIUS access request message and receive, from the RADIUS server via the network device, a RADIUS access accept message that includes the framed IP address. The network device may receive the RADIUS access accept message, which contains the framed IP address, and identify the framed IP address based on the contents of the RADIUS access accept message. The one or more indications of the one or more IP addresses including a RADIUS access accept message may enable the network device to determine the framed IP address.

In some aspects, a network administrator may configure an IP address (e.g., a static IP address) at the network device. Thus, the one or more indications of the one or more IP addresses may include a network configuration (e.g., configured by a network administrator). The one or more indications of the one or more IP addresses including a network configuration may enable the network device to determine the static IP address.

As shown by reference number 120, the network device may determine that the one or more IP addresses are associated with an IPoE subscriber. For example, the network device may determine that the one or more IP addresses are associated with the IPoE subscriber based at least in part on one or more of a DHCP circuit identifier or a DHCP remote identifier. For example, in a case where the one or more IP addresses include an IPv4 address, a DHCP discover packet may carry the circuit ID and remote ID (e.g., DHCP option 82), which identify the IPoE subscriber. The circuit ID may identify an interface and/or VLAN associated with the IPoE subscriber, and the remote ID may identify a remote host associated with the IPoE subscriber. Determining that the one or more IP addresses are associated with the IPoE subscriber based at least in part on one or more of a DHCP circuit identifier or a DHCP remote identifier may enable the network device to determine that one or more IPv4 addresses are associated with the IPoE subscriber.

As shown by reference number 130, the network device may generate, based at least in part on determining that the one or more IP addresses are associated with the IPoE subscriber, a mapping of the one or more IP addresses to an identifier of the IPoE subscriber. For example, the network device may map all of the IPoE subscriber IP addresses to the identifier of the IPoE subscriber. The identifier may be a subscriber resource (e.g., a logical entity) that corresponds to the IPoE subscriber.

Referring to FIG. 1B, and as shown by reference number 140, the network device may receive a network packet associated with at least one IP address of the one or more IP addresses. For example, the network packet may be sent by, or destined for, the client device. For example, the at least one IP address may be a source IP address or a destination IP address of the client device.

As shown by reference number 150, the network device may perform, based at least in part on the mapping of the one or more IP addresses to the identifier of the IPoE subscriber, a network service associated with the network packet on a per-IPoE-subscriber basis. In some aspects, the network device may apply, to the network packet, a firewall policy associated with the IPoE subscriber. For example, the network device may apply the firewall policy on a per-IPoE-subscriber basis (e.g., rather than a per-IP-address basis).

In some aspects, the network device may monitor one or more network statistics associated with the IPoE subscriber. In some examples, the network device may monitor, based at least in part on the network packet, a download volume threshold associated with the IPoE subscriber. In some examples, the network device may monitor, based at least in part on the network packet, a download speed threshold associated with the IPoE subscriber. For example, the network device may monitor the one or more network statistics (e.g., the download volume threshold, the download speed threshold, or the like) on a per-IPoE-subscriber basis (e.g., rather than a per-IP-address basis).

Performing, based at least in part on the mapping of the one or more IP addresses to the identifier of the IPoE subscriber, a network service associated with the network packet on a per-IPoE-subscriber basis may enable the network device to reduce hardware resource usage (e.g., scaling issues) and/or computational complexity. For example, the network device may perform network services based on a single IPoE subscriber identifier (e.g., a single resource) stored in hardware of the network device (e.g., instead of performing network services on a per-IP-address basis for all IP addresses allocated to an IPoE subscriber). As a result, the network device may allocate a single resource (e.g., an IPoE subscriber identifier) irrespective of the quantity of IP addresses allocated to that IPoE subscriber, which may reduce scaling issues (e.g., hardware utilization issues that increase with the quantity of IP addresses). For example, if a dual-stack IPoE subscriber uses at least three IP addresses (e.g., an IPv4 address, an IPv6 IA_NA, and an IPv6 IA_PD address), then the techniques described herein may improve the efficiency supported by a fixed pipeline or semi-flexible pipeline-based ASIC by at least three. If the IPoE subscriber uses additional IP addresses (e.g., a framed IP address, multiple IPv6 addresses, or the like), then the efficiency gains further improve. Thus, introducing the mapping of the one or more IP addresses to the identifier of the IPoE subscriber may reduce IPoE subscriber scaling issues that are present in per-IP-address resource allocation.

Monitoring one or more network statistics associated with the IPoE subscriber on a per-IPoE-subscriber basis may reduce computational complexity. For example, rather than explicitly tracking and aggregating network statistics for an IPoE subscriber via multiple IP addresses associated with the IPoE subscriber, the network device may apply network services (e.g., IPoE subscriber accounting statistics), and collect aggregate states, via a single resource (e.g., the identifier of the IPoE subscriber). Monitoring, based at least in part on the network packet, a download volume or speed threshold associated with the IPoE subscriber on a per-IPoE-subscriber basis may reduce computational complexity associated with monitoring the download volume or speed threshold. For example, the network device may track download activity across IP addresses using a single resource (e.g., the identifier of the IPoE subscriber).

In some aspects, the network device may determine that the one or more IP addresses have become unassociated with the IPoE subscriber and, based at least in part on determining that the one or more IP addresses have become unassociated with the IPoE subscriber, remove (e.g., delete, erase, or the like) the mapping of the one or more IP addresses to the identifier of the IPoE subscriber. In a case where the one or more IP addresses include an IPv4 address or an IPv6 address, the network device may determine that the one or more IP addresses have become unassociated with the IPoE subscriber based on a DHCP renew packet that is rejected or a DHCP release.

In DHCP (e.g., DHCPv4 or DHCPv6), the client device may obtain the IP address for a lease period (e.g., that is defined by a lease length). For example, the DHCP server may provide the IP address to the client device for a lease period that begins at a time of obtainment of the IP address and that persists for the lease length. Accordingly, the client device may communicate with the DHCP server to renew the IP address. For example, the client device may determine that the lease period for the IP address is about to expire, and therefore may communicate with the DHCP server to cause the IP address to be renewed. Therefore, the client device and the DHCP server may communicate to renew the IP address. For example, the client device may send, to the DHCP server, a renew message requesting renewal of the IP address (e.g., to continue reserving the IP address for the client device); and the DHCP server, based on the renew message, may update the lease period for the IP address and may send, to the client device, an acknowledgment message that confirms renewal of the IP address. In some examples, the DHCP server may reject the renewal request. The network device may receive the renewal rejection, from the DHCP server, that is destined for the client device and, based on the renewal rejection, determine that the IP address is no longer associated with the IPoE subscriber.

In DHCP (e.g., DHCPv4 or DHCPv6), the client device may explicitly release the IP address. For example, the client device may explicitly indicate, to the DHCP server, that the client device associated with the IPoE subscriber is no longer using the IP address. The network device may receive the DHCP release, from the client device, that is destined for the DHCP server and, based on the DHCP release, determine that the IP address is no longer associated with the IPoE subscriber.

In a case where the one or more IP addresses include a framed IP address, the network device may determine that the one or more IP addresses have become unassociated with the IPoE subscriber based on a RADIUS accounting stop message (e.g., the RADIUS accounting stop message may be sent by the client device and destined for a RADIUS server). In a case where the one or more IP addresses include a static IP address, the network device may determine that the one or more IP addresses have become unassociated with the IPoE subscriber based on a change to the network configuration (e.g., a network administrator may remove the IP address from the network configuration). Additionally, or alternatively, the network device may determine that the one or more IP addresses have become unassociated with the IPoE subscriber based on a keep-alive mechanism, such as bidirectional forwarding detection (BFD), address resolution protocol (ARP), or the like. For example, the network device may determine, based on a keep-alive mechanism, that the IP address is no longer alive.

Removing the mapping of the one or more IP addresses to the identifier of the IPoE subscriber based at least in part on determining that the one or more IP addresses have become unassociated with the IPoE subscriber may enable the network device to reduce resource utilization and/or accurately perform a network service. For example, the network may delete the mapping, which may enable the network device to allocate resources associated with the mapping elsewhere (e.g., the network device may re-allocate memory that was previously storing the mapping). Additionally, or alternatively, by removing the mapping, the network device may continue to apply a correct firewall policy for a given IPoE subscriber and/or accurately associate network statistics (e.g., download volume or speed) with the correct IPoE subscriber.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
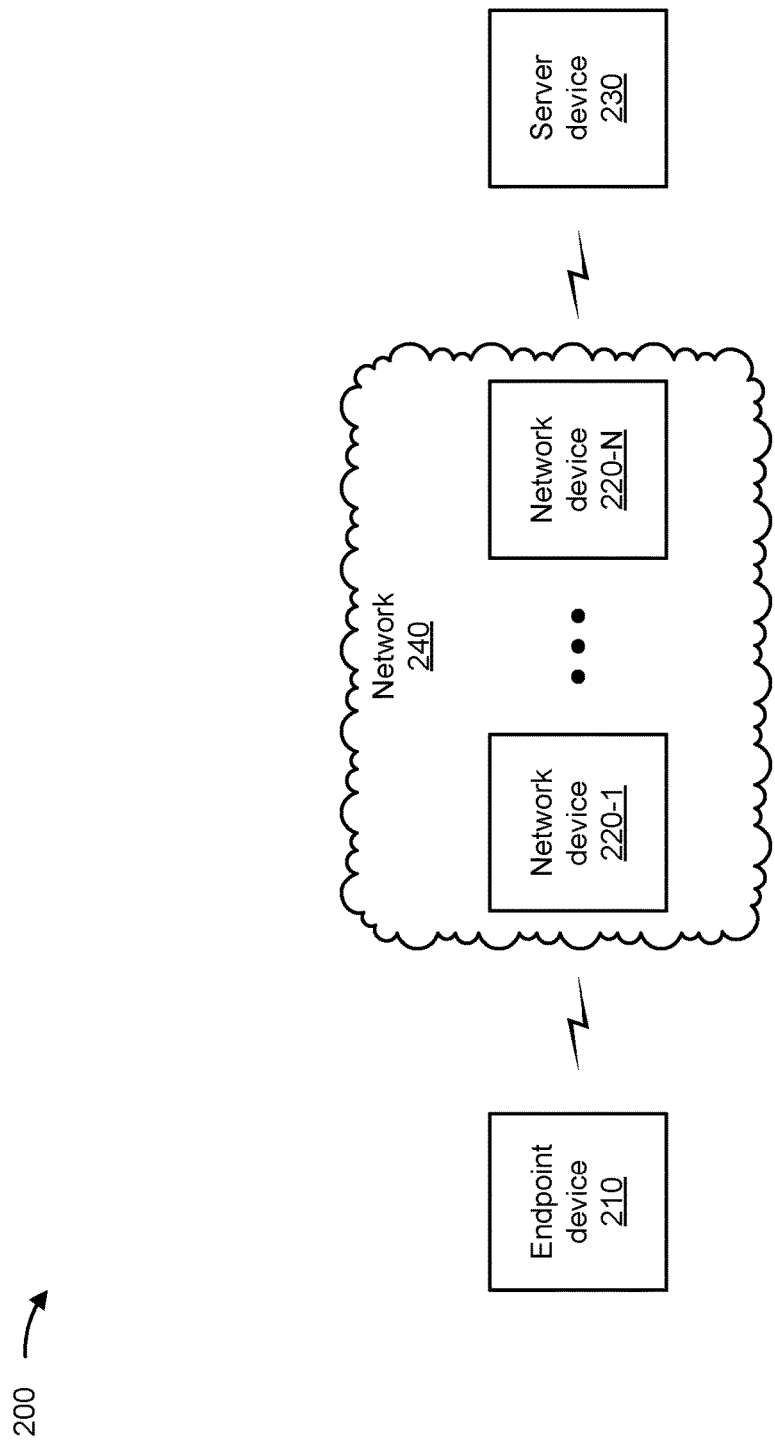
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 210 may receive network traffic from and/or may provide network traffic to other endpoint devices 210 and/or server device 230, via network 240 (e.g., by routing packets using network devices 220 as intermediaries).

Network device 220 includes one or more devices capable of receiving, processing, storing, routing, and/or providing traffic (e.g., a packet or other information or metadata) in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 240.

Server device 230 includes one or more devices capable of receiving, generating, storing, processing, and/or providing information, such as information described herein. For example, server device 230 may include a laptop computer, a tablet computer, a desktop computer, a group of server devices, or a similar type of device, associated with multicast traffic. In some implementations, server device 230 may receive information from and/or transmit information (e.g., multicast traffic) to endpoint device 210, via network 240 (e.g., by routing packets using network devices 220 as intermediaries).

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
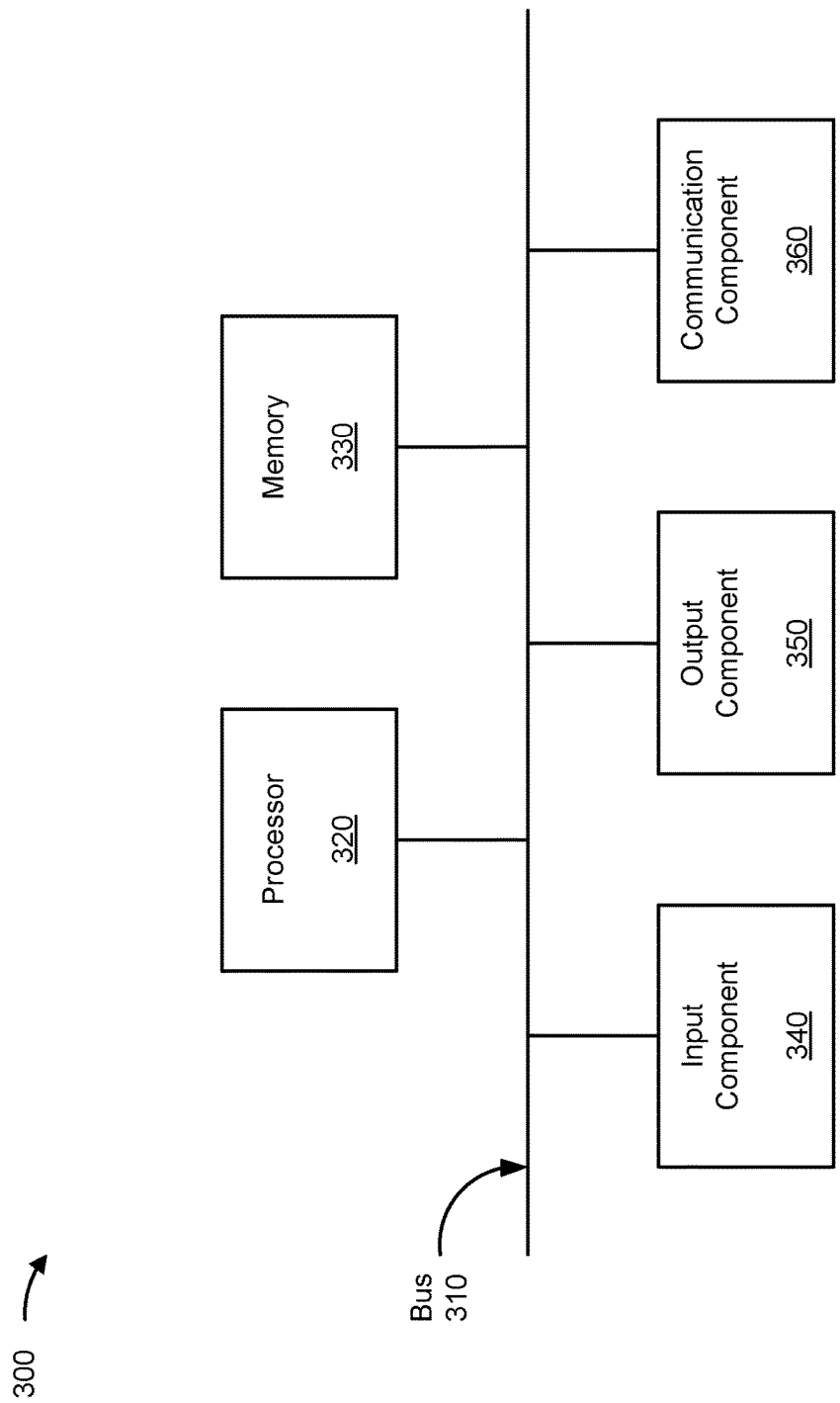
FIG. 3 is a diagram of example components of a device associated with mapping IP addresses to IPoE subscriber identifiers.

FIG. 3 is a diagram of example components of a device 300 associated with mapping IP addresses to IPoE subscriber identifiers. The device 300 may correspond to the network device 220. In some implementations, the network device 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
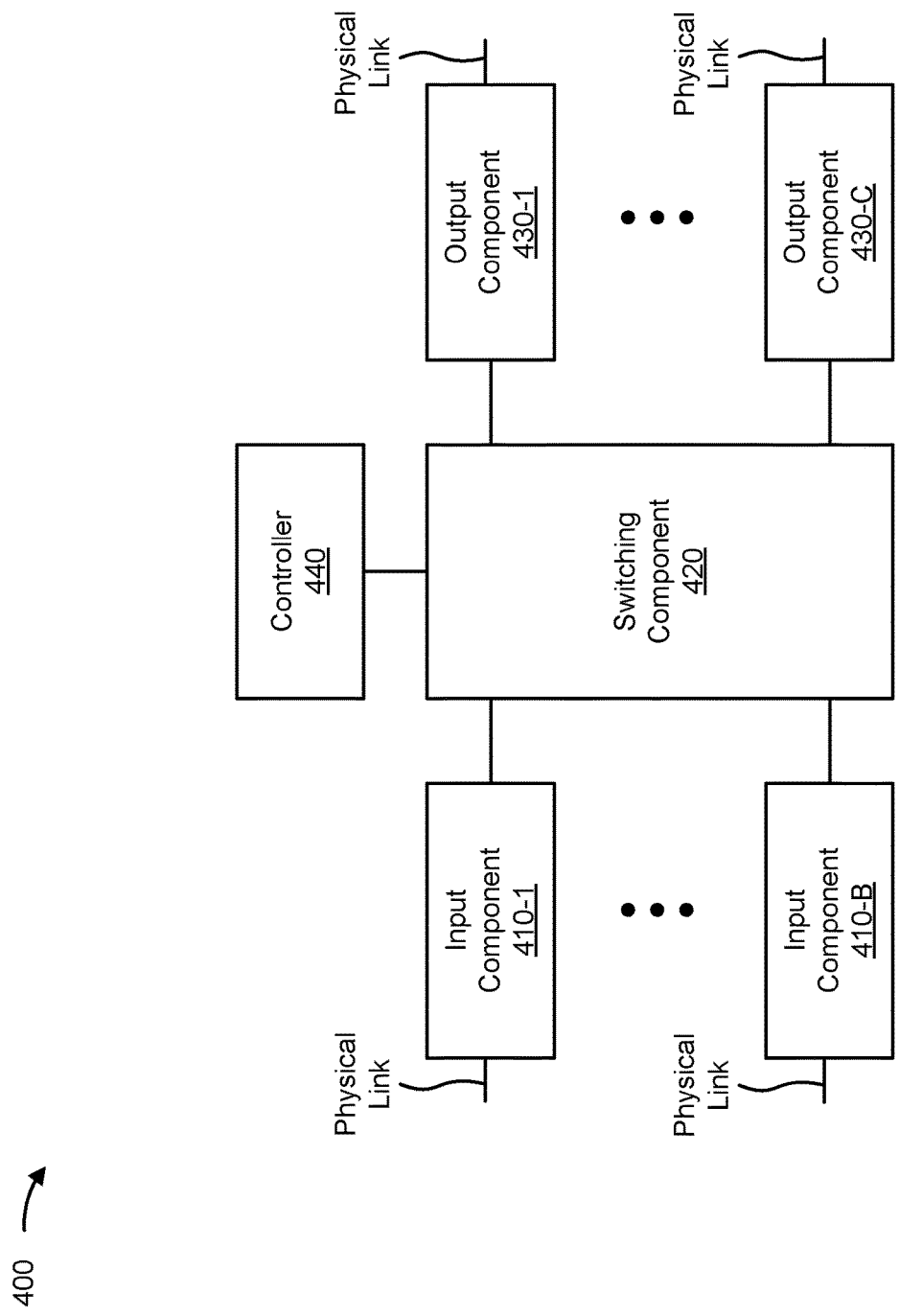
FIG. 4 is a diagram of example components of a device associated with mapping IP addresses to IPoE subscriber identifiers.

FIG. 4 is a diagram of example components of a device 400 associated with mapping IP addresses to IPoE subscriber identifiers. Device 400 may correspond to the network device 220. In some implementations, the network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a central processing unit (CPU), a graphics processing unit (GPU), an accelerated processing unit (APU), a microprocessor, a microcontroller, a digital signal processor (DSP), an field-programmable gate array (FPGA), an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with mapping IP addresses to IPoE subscriber identifiers. In some implementations, one or more process blocks of FIG. 5 are performed by a network device (e.g., network device 220). In some implementations, one or more process blocks of FIG. 5 are performed by another device or a group of devices separate from or including the network device, such as an endpoint device (e.g., endpoint device 210), a network device (e.g., network device 220), and/or a server device (e.g., server device 230). Additionally, or alternatively, one or more process blocks of FIG. 5 may be performed by one or more components of device 300, such as processor 320, memory 330, input component 340, output component 350, and/or communication component 360, and/or one or more components of device 400, such as input components 410, switching component 420, output components 430, and/or controller 440.

As shown in FIG. 5, process 500 may include receiving one or more indications of one or more IP addresses (block 510). For example, the network device may receive one or more indications of one or more IP addresses, as described above.

As further shown in FIG. 5, process 500 may include determining that the one or more IP addresses are associated with an IPoE subscriber (block 520). For example, the network device may determine that the one or more IP addresses are associated with an IPoE subscriber, as described above.

As further shown in FIG. 5, process 500 may include generating, based at least in part on determining that the one or more IP addresses are associated with the IPoE subscriber, a mapping of the one or more IP addresses to an identifier of the IPoE subscriber (block 530). For example, the network device may generate, based at least in part on determining that the one or more IP addresses are associated with the IPoE subscriber, a mapping of the one or more IP addresses to an identifier of the IPoE subscriber, as described above.

As further shown in FIG. 5, process 500 may include receiving a network packet associated with at least one IP address of the one or more IP addresses (block 540). For example, the network device may receive a network packet associated with at least one IP address of the one or more IP addresses, as described above.

As further shown in FIG. 5, process 500 may include performing, based at least in part on the mapping of the one or more IP addresses to the identifier of the IPoE subscriber, a network service associated with the network packet on a per-IPoE-subscriber basis (block 550). For example, the network device may perform, based at least in part on the mapping of the one or more IP addresses to the identifier of the IPoE subscriber, a network service associated with the network packet on a per-IPoE-subscriber basis, as described above.

Process 500 may include additional implementations, such as any single implementation or any combination of implementations described below and/or in connection with one or more other processes described elsewhere herein.

In a first implementation, the one or more indications of the one or more IP addresses include a DHCP offer packet.

In a second implementation, alone or in combination with the first implementation, the one or more indications of the one or more IP addresses include a DHCP advertise packet.

In a third implementation, alone or in combination with one or more of the first and second implementations, the one or more indications of the one or more IP addresses include a RADIUS access accept message.

In a fourth implementation, alone or in combination with one or more of the first through third implementations, the one or more indications of the one or more IP addresses include a network configuration.

In a fifth implementation, alone or in combination with one or more of the first through fourth implementations, determining that the one or more IP addresses are associated with the IPoE subscriber includes determining that the one or more IP addresses are associated with the IPoE subscriber based at least in part on one or more of a DHCP circuit identifier or a DHCP remote identifier.

In a sixth implementation, alone or in combination with one or more of the first through fifth implementations, performing the network service includes applying, to the network packet, a firewall policy associated with the IPoE subscriber.

In a seventh implementation, alone or in combination with one or more of the first through sixth implementations, performing the network service includes monitoring one or more network statistics associated with the IPoE subscriber.

In an eighth implementation, alone or in combination with one or more of the first through seventh implementations, monitoring the one or more network statistics includes monitoring, based at least in part on the network packet, a download volume threshold associated with the IPoE subscriber.

In a ninth implementation, alone or in combination with one or more of the first through eighth implementations, monitoring the one or more network statistics includes monitoring, based at least in part on the network packet, a download speed threshold associated with the IPoE subscriber.

In a tenth implementation, alone or in combination with one or more of the first through ninth implementations, the one or more IP addresses include an IPv4 address.

In an eleventh implementation, alone or in combination with one or more of the first through tenth implementations, the one or more IP addresses include an IPv6 address.

In a twelfth implementation, alone or in combination with one or more of the first through eleventh implementations, the IPv6 address is an IPv6 IA_NA.

In a thirteenth implementation, alone or in combination with one or more of the first through twelfth implementations, the IPv6 address is an IPv6 IA_PD address.

In a fourteenth implementation, alone or in combination with one or more of the first through thirteenth implementations, the one or more IP addresses include a framed IP address.

In an fifteenth implementation, alone or in combination with one or more of the first through fourteenth implementations, the one or more IP addresses include a static IP address.

In an sixteenth implementation, alone or in combination with one or more of the first through fifteenth implementations, process 500 includes determining that the one or more IP addresses have become unassociated with the IPoE subscriber, and removing, based at least in part on determining that the one or more IP addresses have become unassociated with the IPoE subscriber, the mapping of the one or more IP addresses to the identifier of the IPoE subscriber.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, one or more indications of one or more internet protocol (IP) addresses,
      wherein the one or more IP addresses include one or more of an IP version 4 (IPv4) address, an IP version 6 (IPv6) address, a framed IP address, or a static IP address;
   determining, by the network device, that the one or more IP addresses are associated with an IP over Ethernet (IPoE) subscriber;
   generating, by the network device, based at least in part on determining that the one or more IP addresses are associated with the IPOE subscriber, a mapping of the one or more IP addresses to an identifier of the IPOE subscriber;
   monitoring one or more network statistics on a per-IPoE subscriber basis rather than on a per-IP-address basis;
   receiving, by the network device, a network packet associated with at least one IP address of the one or more IP addresses; and
   performing, by the network device, based on the mapping of the one or more IP addresses to the identifier of the IPOE subscriber and based on the monitored one or more network statistics, a network service associated with the network packet on the per-IPoE subscriber basis rather than on a per-IP-address basis.

2. The method of claim 1, wherein the one or more indications of the one or more IP addresses include a dynamic host configuration protocol (DHCP) offer packet.

3. The method of claim 1, wherein the one or more indications of the one or more IP addresses include a dynamic host configuration protocol (DHCP) advertise packet.

4. The method of claim 1, wherein the one or more indications of the one or more IP addresses include a remote authentication dial-in user service (RADIUS) access accept message.

5. The method of claim 1, wherein the one or more indications of the one or more IP addresses include a network configuration.

6. The method of claim 1, wherein determining that the one or more IP addresses are associated with the IPOE subscriber includes:
   determining that the one or more IP addresses are associated with the IPOE subscriber based at least in part on one or more of a dynamic host configuration protocol (DHCP) circuit identifier or a DHCP remote identifier.

7. The method of claim 1, wherein the performing the network service includes:
   applying, to the network packet, a firewall policy associated with the IPOE subscriber.

8. The method of claim 1, wherein monitoring the one or more network statistics includes:
   monitoring, based at least in part on the network packet, a download volume threshold associated with the IPOE subscriber.

9. The method of claim 1, wherein monitoring the one or more network statistics includes:
   monitoring, based at least in part on the network packet, a download speed threshold associated with the IPOE subscriber.

10. A network device, comprising:
    one or more memories; and
    one or more processors to:
       receive one or more indications of one or more internet protocol (IP) addresses,
          wherein the one or more IP addresses include one or more of an IP version 4 (IPv4) address, an IP version 6 (IPv6) address, a framed IP address, or a static IP address;
       determine that the one or more IP addresses are associated with an IP over Ethernet (IPoE) subscriber;
       generate, based at least in part on determining that the one or more IP addresses are associated with the IPOE subscriber, a mapping of the one or more IP addresses to an identifier of the IPOE subscriber;
       monitor one or more network statistics on a per-IPoE subscriber basis rather than on a per-IP-address basis;
       receive a network packet associated with at least one IP address of the one or more IP addresses; and
       perform, based on the mapping of the one or more IP addresses to the identifier of the IPOE subscriber and based on the monitored one or more network statistics, a network service associated with the network packet on the per-IPoE subscriber basis rather than on a per-IP-address basis.

11. The network device of claim 10, wherein the one or more indications of the one or more IP addresses include a dynamic host configuration protocol (DHCP) offer packet.

12. The network device of claim 10, wherein the one or more indications of the one or more IP addresses include a dynamic host configuration protocol (DHCP) advertise packet.

13. The network device of claim 10, wherein the one or more IP addresses include the IPV6 address, and wherein the IPV6 address is an IPV6 identity association for non-temporary address (IA_NA).

14. The network device of claim 10, wherein the one or more IP addresses include the IPV6 address, and wherein the IPV6 address is an IPV6 identity association for prefix delegation (IA_PD) address.

15. The network device of claim 10, wherein the one or more indications of the one or more IP addresses include a remote authentication dial-in user service (RADIUS) access accept message.

16. The network device of claim 10, wherein the one or more indications of the one or more IP addresses include a network configuration.

17. A non-transitory computer-readable medium storing a set of instructions, the set of instructions comprising:
one or more instructions that, when executed by one or more processors of a network device, cause the network device to:
receive one or more indications of one or more internet protocol (IP) addresses,
wherein the one or more IP addresses include one or more of an IP version 4 (IPv4) address, an IP version 6 (IPv6) address, a framed IP address, or a static IP address;
determine that the one or more IP addresses are associated with an IP over Ethernet (IPoE) subscriber;
generate, based at least in part on determining that the one or more IP addresses are associated with the IPOE subscriber, a mapping of the one or more IP addresses to an identifier of the IPOE subscriber;
monitor one or more network statistics on a per-IPoE subscriber basis rather than on a per-IP-address basis;
receive a network packet associated with at least one IP address of the one or more IP addresses; and
perform, based at least in part on the mapping of the one or more IP addresses to the identifier of the IPoE subscriber, a network service associated with the network packet based on the per-IPoE subscriber basis rather than on a per-IP-address basis.

18. The non-transitory computer-readable medium of claim 17, wherein the one or more instructions, when executed by the one or more processors, further cause the network device to:
determine that the one or more IP addresses have become unassociated with the IPOE subscriber; and
remove, based at least in part on determining that the one or more IP addresses have become unassociated with the IPOE subscriber, the mapping of the one or more IP addresses to the identifier of the IPOE subscriber.

19. The non-transitory computer-readable medium of claim 17, wherein the one or more indications of the one or more IP addresses include a dynamic host configuration protocol (DHCP) offer packet or a DHCP advertise packet.

20. The network device of claim 10, wherein monitoring the one or more network statistics comprises monitoring the one or more network statistics on the per-IPoE subscriber basis without explicitly tracking the one or more network statistics over multiple IP addresses.

* * * * *